(12) United States Patent
Choi et al.

(10) Patent No.: US 9,030,123 B2
(45) Date of Patent: May 12, 2015

(54) ILLUMINATING APPARATUS AND DRIVING METHOD THEREOF

(75) Inventors: Sung-Jin Choi, Yongin (KR); Yong-Han Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 195 days.

(21) Appl. No.: 13/398,966

(22) Filed: Feb. 17, 2012

(65) Prior Publication Data

US 2013/0002154 A1   Jan. 3, 2013

(30) Foreign Application Priority Data

Jun. 28, 2011   (KR) .................. 10-2011-0063029

(51) Int. Cl.
*H05B 37/02*   (2006.01)
*H05B 33/04*   (2006.01)
*H05B 33/08*   (2006.01)

(52) U.S. Cl.
CPC .................. *H05B 33/0896* (2013.01)

(58) Field of Classification Search
USPC .............. 315/291, 307, 308, 309, 312; 345/76–82, 211, 212; 313/504, 506, 313/512
See application file for complete search history.

(56) References Cited

U.S. PATENT DOCUMENTS

| 7,626,329 B2 * | 12/2009 | Ryu et al. ............... 313/504 |
| 8,198,826 B2 * | 6/2012 | Lin et al. ............... 315/291 |
| 8,253,661 B2 * | 8/2012 | Sun et al. ............... 345/77 |
| 2006/0214553 A1 * | 9/2006 | Nagara et al. .......... 313/483 |
| 2008/0136337 A1 * | 6/2008 | Rogojevic et al. ...... 315/169.3 |
| 2010/0102712 A1 | 4/2010 | Jou et al. |
| 2011/0109537 A1 * | 5/2011 | Uguen et al. ........... 345/102 |
| 2012/0235980 A1 * | 9/2012 | Tada et al. ............. 345/212 |

FOREIGN PATENT DOCUMENTS

| KR | 10-2005-0065948 A | 6/2005 |
| KR | 10-2008-0067489 A | 7/2008 |
| KR | 10-2008-0079757 A | 9/2008 |
| KR | 10-2010-0047126 | 5/2010 |

\* cited by examiner

*Primary Examiner* — Tung X Le
(74) *Attorney, Agent, or Firm* — Lee & Morse, P.C.

(57) ABSTRACT

An illuminating apparatus includes a drive circuit that generates a drive current, and an organic light emitting panel that receives the drive current and that emits light. The drive circuit is capable of controlling a color temperature of the emitted light from the organic light emitting panel by controlling a current strength of the drive current and is capable of controlling a brightness of the emitted light according to a pulse width of the drive current.

20 Claims, 5 Drawing Sheets

| CATHODE |
| --- |
| ELECTRON INJECTION/TRANSPORT LAYER |
| ELECTRON TRANSPORT/HOLE BLOCKING LAYER |
| SECOND LIGHT EMITTING LAYER |
| FIRST LIGHT EMITTING LAYER |
| HOLE INJECTION/TRANSPORT LAYER |
| ANODE |
| SUBSTRATE |

FIG. 7

| CATHODE |
| --- |
| ELECTRON INJECTION/TRANSPORT LAYER |
| ELECTRON TRANSPORT/HOLE BLOCKING LAYER |
| THIRD LIGHT EMITTING LAYER |
| SECOND LIGHT EMITTING LAYER |
| FIRST LIGHT EMITTING LAYER |
| HOLE INJECTION/TRANSPORT LAYER |
| ANODE |
| SUBSTRATE |

| Freq.-Duty-Driving Current | Intensity | OCT(K) |
|---|---|---|
| 0Hz(DC)-1-0.1mA | 1113.68 | 6625 |
| 120Hz-1/2-0.2mA | 1033.24 | 5719 |
| 120Hz-1/4-0.5mA | 1014.57 | 5026 |
| 120Hz-1/8-1.0mA | 1002.55 | 4525 |
| 120Hz-1/16-2.0mA | 983.14 | 4167 |
| 120Hz-1/32-4.0mA | 977.8 | 3892 |
| 120Hz-1/64-8.0mA | 957.92 | 3677 |
| 120Hz-1/128-16mA | 941.19 | 3510 |

ILLUMINATING APPARATUS AND DRIVING METHOD THEREOF

CROSS-REFERENCE TO RELATED PATENT APPLICATION

This application claims the benefit of Korean Patent Application No. 10-2011-0063029, filed on Jun. 28, 2011, in the Korean Intellectual Property Office, the disclosure of which is incorporated herein in its entirety by reference.

BACKGROUND

In organic light emitting diodes (OLEDs), an organic material is arranged between two electrodes. When a voltage is applied between the two electrodes, a visible light ray is emitted from the organic material. An OLED is a self-light emitting device that may exhibit, e.g., a wide viewing, a superior contrast, and a fast response speed, and has drawn attention in a variety of fields.

SUMMARY

Embodiments may be realized by providing an illuminating apparatus including a drive circuit generating a drive current, and an organic light emitting panel receiving the drive current and emitting light. The drive circuit controls a color temperature of the light emitted from the organic light emitting panel by controlling a current strength of the drive current and controls brightness of the light according to a pulse width of the drive current.

The organic light emitting panel may include an anode receiving the drive current, a first light emitting layer emitting light having a first color component by a combination of electrons and holes, a second light emitting layer emitting light having a second color component different from the first color component by a combination of the electrons and the holes, and a cathode outputting the drive current that passes through the first and second light emitting layers.

The organic light emitting panel may further comprise an electron transport/hole blocking layer that blocks transport of the electrons or blocks transport of the holes. The organic light emitting panel may further comprises a carrier generation layer disposed between the first and second light emitting layers.

The organic light emitting panel may comprise at least one of a hole injection/transport layer deposited adjacent to the anode and transporting the holes in response to the drive current, and an electron injection/transport layer deposited adjacent to the cathode and transporting the electrons in response to the drive current. The organic light emitting panel may further comprise a third light emitting layer emitting light having a third color component by a combination of the electrons and the holes.

The third color component may be the same color component as the first color component and the second light emitting layer may be disposed between the first and third light emitting layers. The organic light emitting panel may comprise a plurality of light emitting units that are serially connected to one another and receive the drive current. The organic light emitting panel may comprise at least one of a first auxiliary electrode that is connected to the anode and a second auxiliary electrode that is connected to the cathode, and the first and second auxiliary electrodes may be formed in a mesh structure.

The drive circuit may further comprise a brightness control unit controlling a pulse width of the drive current in response to a brightness control signal, and a color temperature control unit controlling a current intensity of the drive current in response to a color temperature control signal. The first color component may be any one of red and blue and the second color component may be the other one of red and blue. The illuminating apparatus may be a backlight unit of a liquid crystal display device.

Embodiments may be realized by providing a method of driving an illuminating apparatus that includes an organic light emitting panel receiving a drive current and emitting light. The method includes controlling a pulse width of the drive current in response to a brightness control signal, controlling a current strength of the drive current in response to a color temperature control signal, and outputting the drive current to the organic light emitting panel.

The organic light emitting panel may have a structure in which a first light emitting layer emitting light having a first color component by a combination of electrons and holes and a second light emitting layer emitting light may have a second color component by a combination of the electrons and the holes are deposited. The organic light emitting panel may further comprise an electron transport/hole blocking layer that blocks transport of the electrons or blocks transport of the holes.

The organic light emitting panel may further comprise a carrier generation layer disposed between the first and second light emitting layers. The organic light emitting panel may further comprise a third light emitting layer emitting light having a third color component by a combination of the electrons and the holes. The third color component may be the same color component as the first color component and the second light emitting layer may be disposed between the first and third light emitting, layers.

The organic light emitting panel may comprise a plurality of light emitting units that are serially connected to one another and receive the drive current. The organic light emitting panel may comprise at least one of a first auxiliary electrode that is connected to the anode and a second auxiliary electrode that is connected to the cathode, and the first and second auxiliary electrodes may be formed in a mesh structure.

The first color component may be any one of red and blue and the second color component may be the other one of red and blue. The illuminating apparatus may be a backlight unit of a liquid crystal display device.

BRIEF DESCRIPTION OF THE DRAWINGS

Features will become apparent to those of ordinary skill in the art by describing in detail exemplary embodiments thereof with reference to the attached drawings in which.

DETAILED DESCRIPTION

The attached drawings for illustrating exemplary embodiments are referred to in order to gain a sufficient understanding of the scope of the invention, the merits thereof, and the objectives accomplished by the implementation of the embodiments. Example embodiments may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
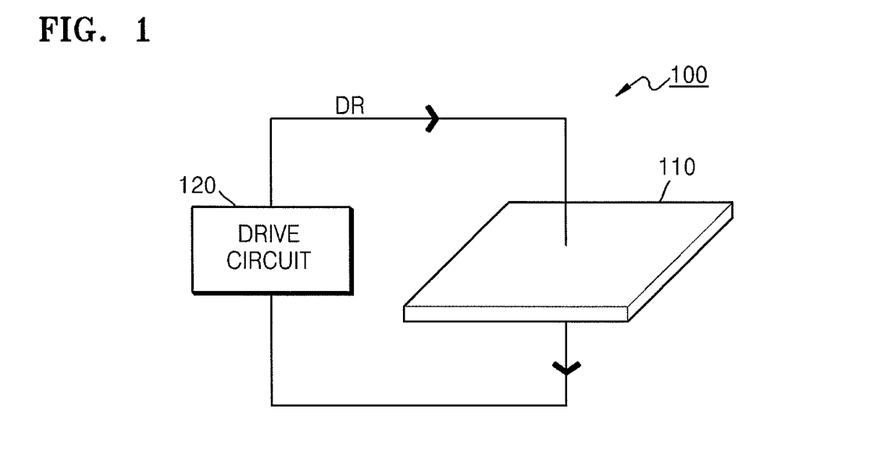
FIG. 1 illustrates a view schematically showing the structure of an illuminating apparatus, according to an exemplary embodiment.

FIG. 1 illustrates a view schematically showing the structure of an illuminating apparatus 100 according to an exemplary embodiment. Referring to FIG. 1, the illuminating apparatus 100 according to the present embodiment may include an organic light emitting panel 110 and a drive circuit 120. The drive circuit 120 may generate a drive current DR and may supply the generated drive current DR to the organic light emitting panel 110.

Figure 2:
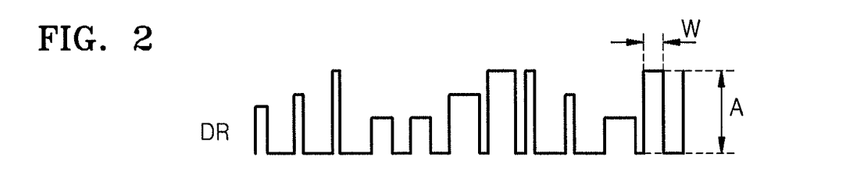
FIG. 2 illustrates a waveform diagram of a drive current DR, according to an exemplary embodiment.

FIG. 2 illustrates a waveform diagram of the drive current DR according to an exemplary embodiment. Referring to FIG. 2, the drive current DR according to the present embodiment may have a pulse width W determined according to the brightness of light to be emitted by the organic light emitting panel 110 and a current strength A determined according to the color temperature of the light. The brightness and color temperature of the emitted light may be input by a user or respectively determined according to a brightness control signal and a color temperature control signal input by a predetermined system.

In embodying the illuminating apparatus 100, e.g., using the organic light emitting panel 110 where a plurality of organic light emitting layers emitting light of different color components are deposited, the color temperature of the illuminating apparatus 100 may be controlled by using the current strength A of the drive current DR. The organic light emitting panel 110, according to an exemplary embodiment, may have a structure in which the organic light emitting layers are deposited having a characteristic that the color temperature varies according to the current strength A. The color temperature of the organic light emitting panel 110 may vary according to a current density. The current density may be controlled according to the current strength A.

The brightness of the illuminating apparatus 100 may be controlled by controlling the pulse width of the drive current DR. When the color temperature is controlled by controlling the current strength A, the brightness may vary according as the current strength A varies. In an exemplary embodiment, the pulse width W may be controlled independently of the current strength A, e.g., to control the brightness and thus the illuminating apparatus 100 may be capable of controlling the brightness together with the color temperature.

The drive current DR may be configured such that the current strength A, that is, amplitude, of each pulse can be controlled and the pulse width W can be controlled, at a constant frequency. Accordingly, in the illuminating apparatus 100, the color temperature and the brightness may be controlled at every cycle of the drive current DR. For example, a frequency of the drive current DR may be 60 Hz or higher and a duty rate of each pulse may be controlled within a range from 0% to 100%.

According to an exemplary embodiment, the structure may include having only one type of the drive current DR applied to electrodes of the organic light emitting panel 110 without a pixel circuit structure of a display device. As such the color temperature and the brightness of the illuminating apparatus 100 may be simultaneously controlled with a simple structure.

A method of controlling colors by patterning a red light emitting area, a green light emitting area, and a blue light emitting area and applying a current to each area reduces an aperture ratio which may, e.g., cause deterioration in light intensity. A predetermined type of a pattern that is visible may cause fatigue of eyes and dizziness. Further, it is inconvenient to separately control a drive module with respect to each color component.

In contrast, according to an exemplary embodiment, the light areas of different color components do not need to be patterned, and an aperture ratio and light intensity increases compared to the method of performing patterning for each color component. Also, a sense of fatigue of a user due to the pattern may be remarkably reduced and a cozy illuminating light may be provided. Furthermore, only one drive signal may be generated, e.g., without separately including a drive module for each color component, so that complicacy of a drive module may be remarkably reduced.

Also, the structure, in which the organic light emitting panel 110 is not patterned for each color component, may remarkably reduce a process complicacy. For example, the organic light emitting panel 110 may be formed by depositing the organic light emitting layers using an open mask without a pattern, and thus a process of manufacturing the display device is simplified due to the omission of a patterning process.

Figure 3:
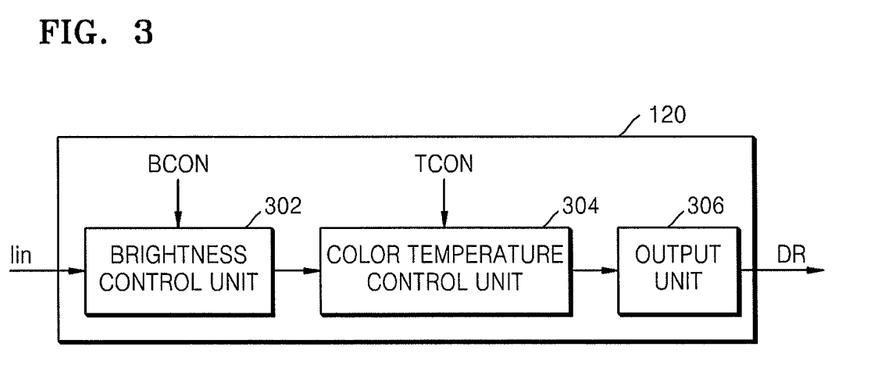
FIG. 3 illustrates a block diagram schematically showing the structure of a drive circuit, according to an exemplary embodiment.

FIG. 3 illustrates a block diagram schematically showing the structure of the drive circuit 120 according to an exemplary embodiment. Referring to FIG. 3, the drive circuit 120 may include a brightness control unit 302, a color temperature control unit 304, and an output unit 306. The drive circuit 120 may receive an input current Iin having a predetermined frequency, control the current strength A and the pulse width W of each pulse, and generate and output a drive current DR.

The brightness control unit 302 may receive a brightness control signal BCON and control the pulse width W of the input current Iin. The pulse width W may be controlled independently at every cycle.

The color temperature control unit 304 may receive the input current Iin having the pulse width W controlled by the brightness control unit 302, and may control the current strength A of the input current Iin according to a color temperature control signal TCON. The current strength A may be controlled independently at every cycle.

The output unit 306 outputs the input current Iin whose pulse width W is controlled by the brightness control unit 302 and the current strength A by the color temperature control unit 304, to the organic light emitting panel 110 as the drive current DR. The output unit 306 may be embodied by using an operation amplifier.

In FIG. 3 the input current Iin is controlled first by the brightness control unit 302 and then by the color temperature control unit 304. However, embodiments are not limited thereto, e.g., the processing order of the brightness control unit 302 and the color temperature control unit 304 may be changed.

Figure 4:
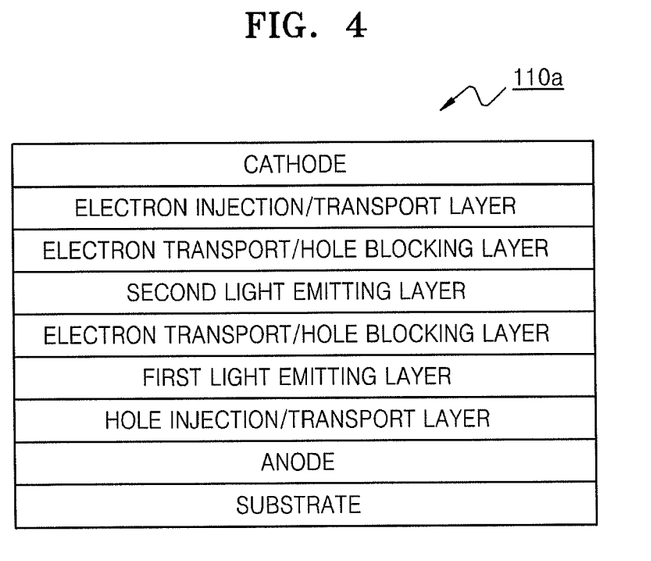
FIG. 4 illustrates a view schematically showing the structure of an organic light emitting panel, according to an exemplary embodiment.

FIG. 4 illustrates a view schematically showing the structure of an organic light emitting panel 110a according to an exemplary embodiment. Referring to FIG. 4, the organic light emitting panel 110a may have a structure, e.g., a stacked structure, of a substrate, an anode, a hole injection/transport layer, a first light emitting layer, an electron transport/hole blocking layer, a second light emitting layer, an electron transport/hole blocking layer, an electron injection/transport layer, and a cathode.

The substrate may be formed of a transparent glass material using $SiO_2$ as a main ingredient. However, embodiments of the substrate are not limited thereto, e.g., the substrate may be formed of a transparent plastic material. The plastic material for forming the substrate may be an insulating organic material including at least one of polyethersulphone (PES), polyacrylate (PAR), polyetherimide (PEI), polyethyelenen napthalate (PEN), polyethyeleneterepthalate (PET), polyphenylene sulfide (PPS), polyallylate, polyimide, polycarbonate (PC), cellulose triacetate (TAC), and cellulose acetate propionate (CAP).

The anode may be arranged on the substrate. Although not illustrated in the drawing, a buffer layer (not shown) may be provided between the substrate and the anode. The buffer layer may provide a flat surface on an upper portion of the substrate and may reduce the possibility of and/or prevent intrusion of moisture and foreign materials to substrate. The buffer layer may be formed using, e.g., an insulating material.

The anode may be formed using an anode material having a high work function by, e.g., a deposition method or sputtering method. The anode may be a layer formed of a material including at least one of indium zinc oxide (IZO), indium tin oxide (ITO), $SnO_2$, ZnO, Ni, Ag, Au, Al, Pt, Pd, Rh, Ru, Ir, W, Mo, Cr, Ta, and Nb. The anode may be formed to be a transparent electrode or a reflective electrode. The anode may have a single layer structure or a multilayer structure.

An interlayer may be formed on the anode. The interlayer may include a plurality of light emitting layers for emitting visible light rays when a voltage is applied between the anode and the cathode. To facilitate transport of electric charges and effectively generate a visible light ray, the interlayer may include at least one of the hole injection/transport layer, the electron transport/hole blocking layer, a carrier generation layer, and the electron injection/transport layer.

According to an exemplary embodiment, the hole injection/transport layer may be provided on, e.g., directly on, the anode. The hole injection/transport layer transports holes input through the anode to the first light emitting layer. The hole injection/transport layer may include, e.g., a hole injection layer (HIL) and a hole transport layer (HTL). According to an exemplary embodiment, the HIL may be formed directly on the anode and the HTL may be formed directly on the HIL. However, embodiments are not limited thereto.

A hole injection material, e.g., a well-know hole injection material, may be used as a material for the hole injection layer (HIL). Examples of hole injection material include, e.g., a phthalocyanine compound such as copper phthalocyanine, m-MTDATA [4,4',4''-tris(3-methylphenylphenylamino)triphenylamine], N,N'-di(1-naphthyl)-N,N'-diphenylbenzidine (NPB), TDATA, 2-TNATA, polyaniline/dodecylbenzenesulfonic acid (Pani/DBSA), poly(3,4-ethylenedioxythiophene)/poly(4-styrenesulfonate)(PEDOT/PSS), polyaniline/camphor sulfonicacid (Pani/CSA), or polyaniline)/poly(4-styrenesulfonate) (PANI/PSS). However, embodiments are not limited thereto.

m MTDATA

TDATA

2-TNATA

NPB

The HTL may be formed on an upper portion of the HIL using a variety of methods such as a vacuum deposition method, a spin coating method, a cast method, Langmuir-Blodgett (LB) method, etc. When the HTL is formed by a vacuum deposition method and a spin coating method, although deposition conditions and coating conditions may vary according to a compound in use, the deposition and coating conditions may be generally selected within almost the same condition ranges as those for forming the HIL.

Examples of HTL materials include, e.g., carbazole derivatives such as N-phenyl carbazole, polyvinyl carbazole, etc., or amine derivatives having aromatic condensed rings such as NPB, N,N'-bis(3-methylphenyl)-N,N'-diphenyl-[1,1-biphenyl]-4,4'-diamine (TPD), N,N-di(naphthalene-1-yl)-N,N'-diphenyl benzidine (α-NPD), etc. Among these materials, TCTA, e.g., may reduce the possibility of and/or prevent diffusion of excitons from the light emitting layer, in addition to the hole transport function.

α-NPD

TPD

The first and second light emitting layers emit light may have different color components. For example, if the organic light emitting panel 110 emits white light, any one of the first and second light emitting layers may be a red light emitting layer and the other one may be a blue light emitting layer. According to an exemplary embodiment, the first light emitting layer may be a red light emitting layer and the second light emitting layer may be a blue light emitting layer. In another example, the first light emitting layer may be a blue light emitting layer and the second light emitting layer may be a red light emitting layer. A color temperature characteristic of the organic light emitting panel 110 according to a change in the current strength A may vary depending on where the red light emitting layer and the blue light emitting layer are located.

When the first light emitting layer at the anode side is a blue light emitting layer and the second light emitting layer at the cathode side is a red light emitting layer, the color temperature may increase as the current strength A of the drive current DR increases. Reversely, if the first light emitting layer is a red light emitting layer and the second light emitting layer is a blue light emitting layer, the color temperature may decrease as the current strength A of the drive current DR increases. However, these characteristics are not absolute. For example, since the above is related to movement of a light emitting area and an efficiency with respect to the drive current DR of each light emitting layer, the color temperature may be changed according to a use of an electron blocking layer (EBL), a hole blocking layer (HBL), or the electron transport/hole blocking layer, and/or to a change in mobility according to a doping amount with respect to the first and/or second light emitting layer.

The mobility of a carrier changes according to what type of a dopant is used for a host of the first and second light emitting layers and thus a light emitting characteristic of the organic light emitting panel 110 may be changed. For example, the host may have an electron transport propensity or a hole transport propensity. Also, the mobility of a carrier may change according to the doping amount of the first and second light emitting layers, and further to the current strength A of the drive current DR. The change in the mobility of the first and second light emitting layers is one of important factors to adjust the position of the light emitting area.

The first and second light emitting layers may be formed of a variety of light emitting materials including well-known host and dopant materials. For example, a well-known fluorescent dopant and a well-known phosphorescent dopant may be all used as the dopant.

For example, Alq3, 4,4'-N,N'-dicarbazole-biphenyle (CBP), 9,10-di(naphthalene-2-yl)anthracene (ADN), distyrylarylene (DSA), etc. may be used for the host. However, embodiments are not limited thereto.

PtOEP), Ir(piq)$_3$), Btp$_2$Ir(acac), 4-(dicyanomethylene)-2-t-butyl-6(1,1,7,7-tetramethyljulolidyl-9-enyl)-4H-pyran

(DCJTB), etc. may be used for the well-known red dopant. However, embodiments are not limited thereto.

PtOEP

Ir(piq)₃

Btp₂Ir(acac)

Ir(ppy)₃ (ppy=phenylpyridin), Ir(ppy)₂(acac), Ir(mpyp)₃, C545T, etc. may be used for the well-known green dopant. However, embodiments are not limited thereto.

Ir(ppy)₃

Ir(ppy)₂(acac)

Ir(mpyp)₃

C545T

F₂Irpic, (F₂ppy)₂Ir(tmd), Ir(dfppz)₃, ter-fluorene, 4,4'-bis(4-diphenylaminostaryl)biphenyl (DPAVBi), 2,5,8,11-tetra-t-butyl perylene (TBP), etc. may be used for the well-known blue dopant. However, embodiments are not limited thereto.

F₂Irpic (F₂ppy)₂Ir(tmd)

Ir(dfppz)₃

DPAVBi

TBP

The electron transport/hole blocking layer may be provided between the first and second light emitting layers. Another electron transport/hole blocking layer may also be provided on the second light emitting layer. In the first and second light emitting layers, electrons and holes may be recombined to generate excitons. The excitons contribute to emission of light so that visible light may be emitted from the first and second light emitting layers. A light emitting zone where excitons are generated may be placed, e.g., in a lengthwise direction, in the deposited first and second light emitting layers or placed throughout the HTL or an electron transport layer (ETL) that does not emit light, thereby reducing light emission efficiency. The electron transport/hole blocking layer may reduce the possibility of and/or prevent the movement of a carrier, that is, electrons or holes, thereby confining the carriers in a certain area like a wall. In an exemplary embodiment, the light emitting zone may be moved or confined by appropriately using the HBL and the EBL so that the light emission efficiency of the first and second light emitting layers may be controlled and the color temperature characteristic according to the drive current DR of the organic light emitting panel 110a may be controlled.

When the first and second light emitting layers include a phosphorescent dopant, e.g., to reduce the possibility of and/or prevent triplet excitons or holes from being diffused in the ETL, the electron transport/hole blocking layer may be formed on an upper portion of the first light emitting layer and/or second light emitting layer. A material used for the electron transport/hole blocking layer may not be particularly restricted and any materials, e.g., of well-known materials, used for the electron transport/hole blocking layer may be used. For example, a material for the electron transport/hole blocking layer may include at least one of oxadiazole derivative, a triazole derivative, a phenanutrroline derivative, Bis(2-methyl-8-quinolinolato-N1,O8)-(1,1'-Biphenyl-4-olato)aluminum (Balq), and bathocuproine (BCP).

The electron injection/transport layer may be deposited on the electron transport/hole blocking layer provided on the second light emitting layer. The electron injection/transport layer may transport electrodes input through the cathode toward the second light emitting layer. The electron injection/transport layer may be formed of an electron injection layer (EIL) and the ETL.

The ETL may be formed of any material, e.g., of well-know materials for the ETL. For example, a well-know material such as a quinoline derivative such as tris(8-quinolinolate)aluminum (Alq3), TAZ, Balq, etc., may be used for the ETL. However, embodiments are not limited thereto.

TAZ

BAlq

The EIL is a layer for facilitating injection of electrons from the cathode and may be deposited on the ETL. A material for the EIL may include at least one LiF, NaCl, CsF, $Li_2O$, and BaO. However, embodiments are not limited thereto.

The cathode may be formed by using a variety of conductive materials. For example, the cathode may be a layer formed of at least one of IZO, ITO, $SnO_2$, ZnO, Ni, Ag, Au, Al, Pt, Pd, Rh, Ru, Ir, W, Mo, Cr, Ta, and Nb. The cathode may be formed of a transparent electrode or a reflective electrode. The cathode may be a single layer structure or a multilayer structure.

Figure 5:
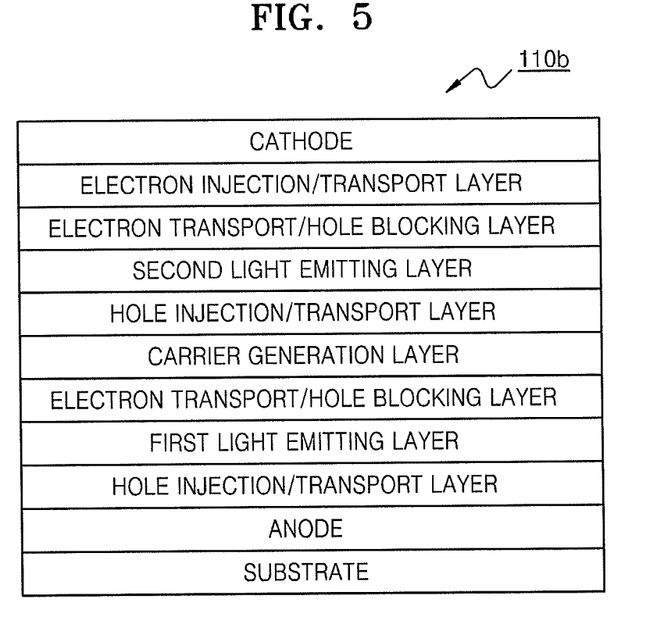
FIG. 5 illustrates a view schematically showing the structure of an organic light emitting panel, according to another exemplary embodiment.

FIG. 5 illustrates a view schematically showing the structure of an organic light emitting panel 110b according to another exemplary embodiment. Referring to FIG. 5, the organic light emitting panel 110b may have a structure, e.g., a stacked structure, of the substrate, the anode, the hole injection/transport layer, the first light emitting layer, the electron transport/hole blocking layer, a carrier generation layer (CGL), the hole injection/transport layer, the second light emitting layer, the electron transport/hole blocking layer, the electron injection/transport layer, and the cathode.

The CGL, according to an exemplary embodiment in a tandem structure, may facilitate flow of electrons and holes between the first and second light emitting layers and may reduce the possibility of and/or prevent an excessive increase of a voltage applied to each of the first and second light emitting layers. The CGL may include, e.g., a hole generation layer disposed close to the cathode and an electron generation layer disposed close to the anode. The electron generation layer may be formed of a material abundant with electrons or may be formed by doping an n-type dopant. The hole generation layer may be formed of a material abundant with holes or may be formed by doping a p-type dopant. The light emission characteristic of the organic light emitting panel 110b may vary according to the propensities of the electron generation layer and the hole generation layer. For example, by optimizing n-doping in the electron generation layer and applying an electric field thereto, electrons are supplied from the electron generation layer so that the light intensity of the first light emitting layer is increased.

In the present embodiment, the mobility of the hole injection/transport layer under the first light emitting layer may be controlled to adjust the recombination of electrons and holes in the first light emitting layer. For example, when a material having a fast hole mobility is used for the hole injection/transport layer and an electron generation layer capable of generating electrons well is in use, as the current strength A of the drive current DR increases, recombination match between electrons and holes may be optimized so that, e.g., an effect of shifting the color temperature to a color component area of the first light emitting layer may be greatly achieved.

Figure 6:
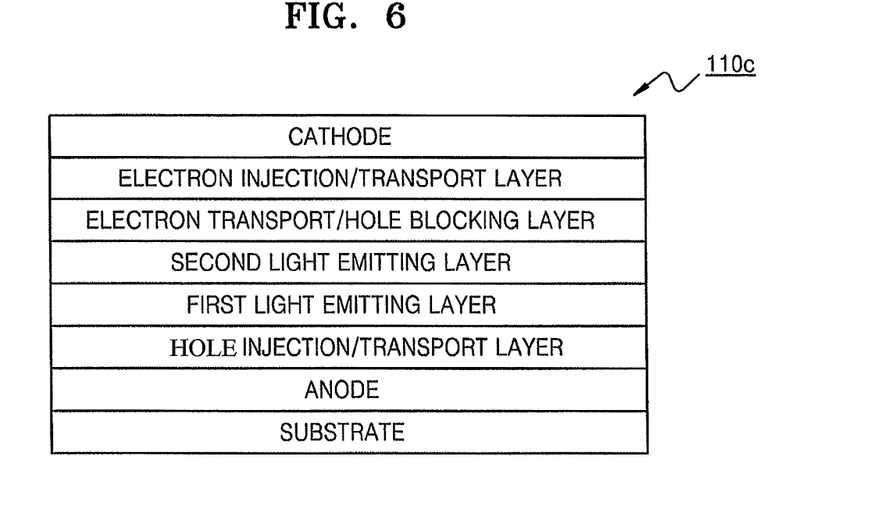
FIG. 6 illustrates a view schematically showing the structure of an organic light emitting panel, according to another exemplary embodiment.

FIG. 6 illustrates a view schematically showing the structure of an organic light emitting panel 110c according to another exemplary embodiment. Referring to FIG. 6, the organic light emitting panel 110c according to the present embodiment has a structure, e.g., a stacked structure, of the substrate, the anode, the hole injection/transport layer, the first light emitting layer, the second light emitting layer, the electron transport/hole blocking layer, the electron injection/transport layer, and the cathode. In the present embodiment, with a simple structure only, the thickness of the electron transport/hole blocking layer may be controlled so that the position of a light emitting area and light emission efficiency may be controlled and the color temperature characteristic may be controlled.

Figure 7:
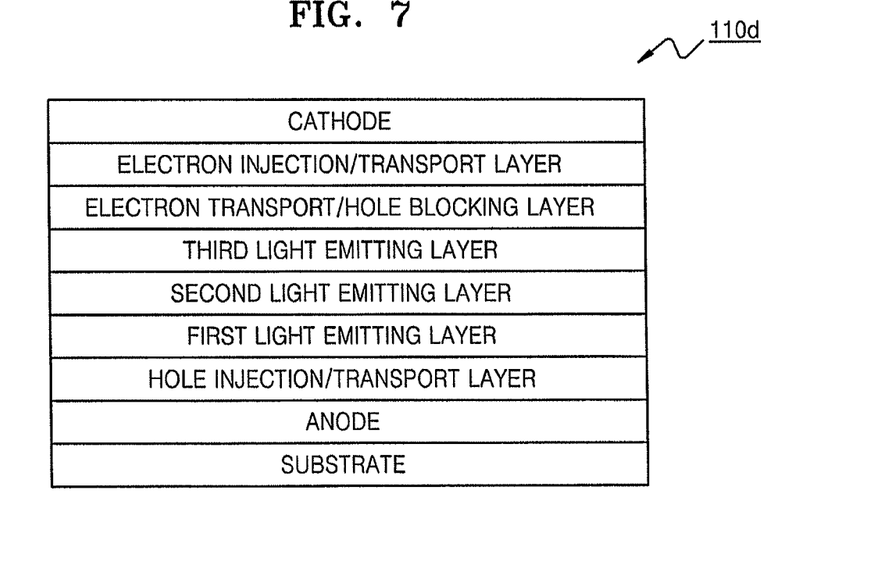
FIG. 7 illustrates a view schematically showing the structure of an organic light emitting panel, according to another exemplary embodiment.

FIG. 7 illustrates a view schematically showing the structure of an organic light emitting panel 110d according to another exemplary embodiment. Referring to FIG. 7, the organic light emitting panel 110d according to the present embodiment has a structure, e.g., a stacked structure, of the substrate, the anode, the hole injection/transport layer, the first light emitting layer, the second light emitting layer, a third light emitting layer, the electron transport/hole blocking layer, the electron injection/transport layer, and the cathode.

According to an exemplary embodiment, the first light emitting layer, the second light emitting layer, and the third light emitting layer may be a red light emitting layer, a green light emitting layer, and a blue light emitting layer, respectively. In the present embodiment, white light having a variety of color temperatures may be generated by a combination of red light, green light, and blue light.

According to another example of the present embodiment, the first and third light emitting layers may be a red light emitting layer and the second light emitting layer may be a blue light emitting layer. Reversely, the first and third light emitting layers may be a blue light emitting layer and the second light emitting layer may be a red light emitting layer.

In a structure having three light emitting layers as in the present embodiment, the electron transport/hole blocking layer may be arranged on the third light emitting layer to, e.g., control the light emission efficiency of the middle light emitting layer, that is, the second light emitting layer, as the current intensity A of the drive current DR increases, so that the color temperature characteristic of the organic light emitting panel 110d may be controlled. In a sandwich structure as in the present embodiment, an appropriate wall structure may be used and/or needed to improve the light emission efficiency of the second light emitting layer.

When a band gap of the second light emitting layer is smaller than that of each of the first and third light emitting layers the light emission efficiency of the second light emitting layer may be improved. Also, as in the present embodiment, the electron transport/hole blocking layer may improve the light emission efficiency of a wall structure having a relatively low absolute value of the highest occupied molecular orbital (HOMO). When the absolute value of the HOMO of the second light emitting layer is greater than that of the third light emitting layer, the organic light emitting panel 110d may be designed so that the third light emitting layer between the second light emitting layer and the electron transport/hole blocking layer may emit more light.

Figure 8:
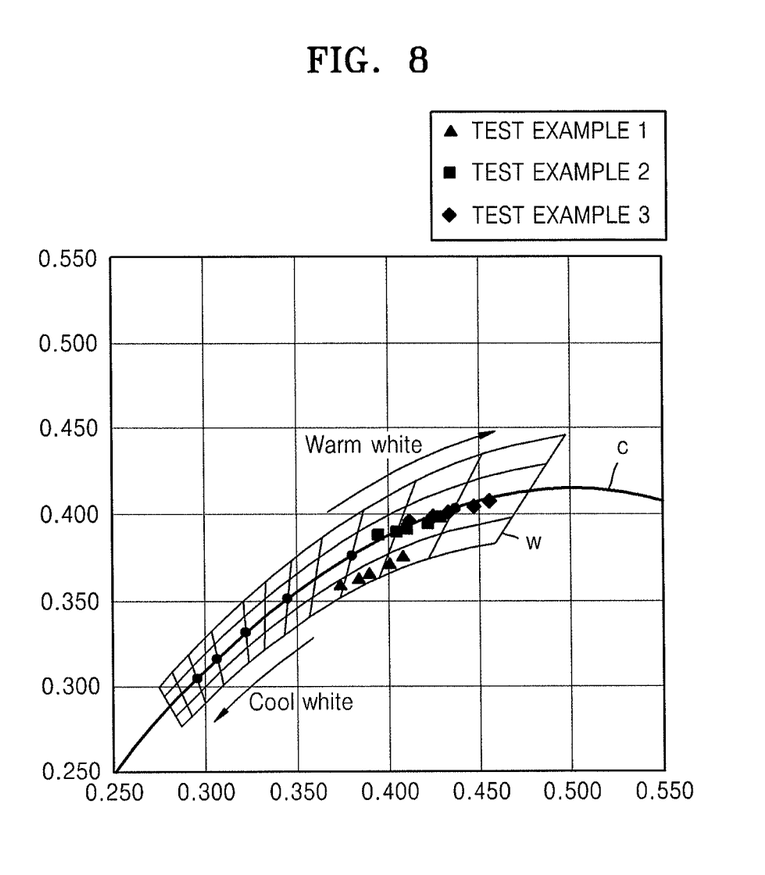
FIG. 8 illustrates a graph showing a change in the color temperature according to changes in the current strength A and the thickness of an electron transport/hole generation layer on the first light emitting layer in the organic light emitting panel of FIG. 5.

FIG. 8 illustrates a graph showing a change in the color temperature according to changes in the current strength A and the thickness of the electron transport/hole generation layer on the first light emitting layer in the organic light emitting panel 110b of FIG. 5. FIG. 8 shows the color temperature according to the CIE 1931 color coordinate system. In FIG. 8, the thickness of the electron transport/hole generation layer increases in order from test example 1 to test example 2 and test example 3.

In FIG. 8, a curve C denotes a black body curve and an area W denotes a white light area. White light of a variety of color temperatures may be produced in the area W. The white light closer to the upper right side becomes warmer, while the white light closer to the lower left side becomes colder. Also, FIG. 8 shows an example in which the first light emitting layer is a red light emitting layer and the second light emitting layer is a blue light emitting layer.

As shown in FIG. 8, it may be seen that, as the thickness of the electron transport/hole generation layer increases, the color temperature of the emitted light decreases. This means that, by increasing the thickness of the electron transport/hole blocking layer to increase a hole density in the first light emitting layer, the light emission efficiency of the first light emitting layer may be improved.

Also, points of the respective test examples of FIG. 8 correspond to higher current strength A as the points are located closer to the right side. That is, the organic light emitting panel 110b of FIG. 5 has a characteristic that the color temperature decreases as the current strength A increases.

Figure 9:
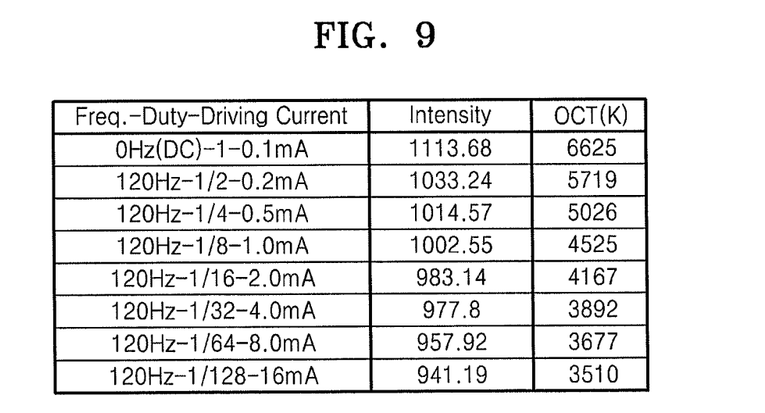
FIG. 9 illustrates a table showing a change in the color temperature according to changes in the pulse width W and the current strength A in the organic light emitting panel of FIG. 5.

FIG. 9 illustrates a table showing a change in the color temperature according to changes in the pulse width W and the current strength A in the organic light emitting panel 110b of FIG. 5. FIG. 9 is a table showing light intensity and color temperature (OCT) are measured while increasing a frequency of the drive current DR and variously changing duty for control of the pulse width W compared to the test examples of FIG. 8. As illustrated in FIG. 9, while controlling the drive current DR in a range from about 0.1 mA to about 16 mA, the color temperature (OCT) may be controlled in a wide range from about 3500 K to about 6625 K. Also, while controlling the color temperature, the light intensity may be maintained almost constant through the control of the pulse width W.

Figure 10:
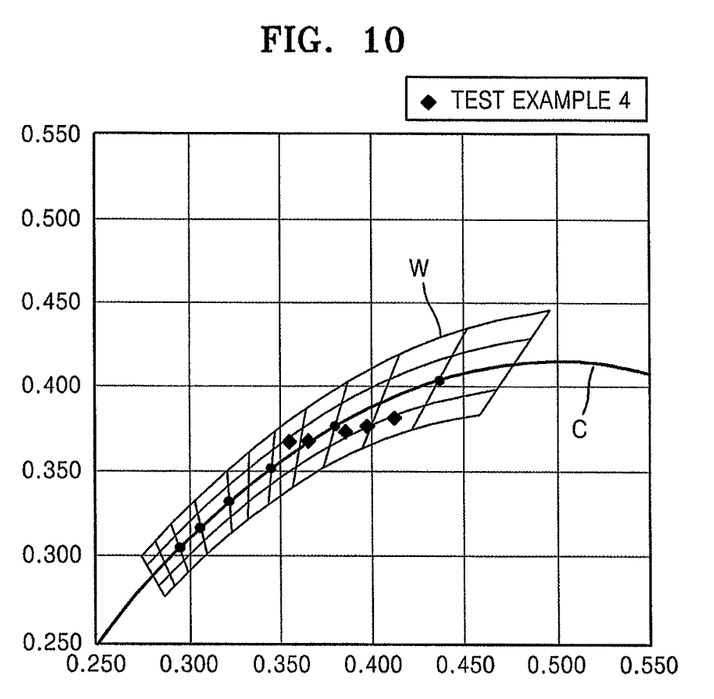
FIG. 10 illustrates a graph showing a change in the color temperature according to changes in the current strength A and the thickness of an electron transport/hole generation layer on the first light emitting layer in the organic light emitting panel of FIG. 4.

FIG. 10 illustrates a graph showing a change in the color temperature according to changes in the current strength A and the thickness of an electron transport/hole generation layer on the first light emitting layer in the organic light emitting panel 110a of FIG. 4. FIG. 10 also shows the color temperature according to the CIE 1931 color coordinate system. In FIG. 10, a curve C denotes a black body curve and an area W denotes a white light area. The white light closer to the upper right side becomes warmer, while the white light closer to the lower left side becomes colder. Also, FIG. 10 shows an example in which the first light emitting layer is a red light emitting layer and the second light emitting layer is a blue light emitting layer.

Points in test example 4 shown in FIG. 10 correspond to higher current strength A as the points are located closer to the left side. That is, by controlling the thickness of the electron transport/hole blocking layer on the first light emitting layer of FIG. 4, the color temperature characteristic that the color temperature increase as current increases may be obtained. In the test example 4, the electron transport/hole blocking layer on the first light emitting layer is thinly deposited, while the electron transport/hole blocking layer on the second light emitting layer is relatively thickly deposited. In this case, the recombination is optimized in the second light emitting layer and red light emission in the light emission area of the second light emitting layer may be easily saturated. As the current increases, more holes may be accumulated in the first light emitting layer. Accordingly, the recombination area of the second light emitting layer may be shifted toward the first light emitting layer, thereby contributing to blue light emission. As such, according to the present embodiment, the color temperature characteristic may be changed by controlling the characteristic and thickness of the electron transport/hole blocking layer.

Likewise, the illuminating apparatus 100 according to the present embodiment may emit white light of various color temperatures and embody white light in a range from about 2000 K to about 10000 K.

Since the organic light emitting panels 110, 110a, 110b, 110c, and 110d according to the above-described embodiments have structures in which a plurality of light emitting layers are deposited between the anode and the cathode, it is possible to form an auxiliary electrode at the anode and/or the cathode. Furthermore, it is possible to apply a mesh structure or a honeycomb structure to the auxiliary electrode. When an organic light emitting device is formed by dividing an area by each color component, since an anode or cathode electrode may be separated by each color component, it is difficult to apply a mesh structure. In contrast, according to embodiments, by applying an auxiliary electrode having a mesh structure to the anode and/or the cathode, the possibility of brightness being changed for each area due to IR voltage drop may be reduced and/or prevented. This structure is particularly effective to the illuminating apparatus 100 having a large area.

Figure 11:
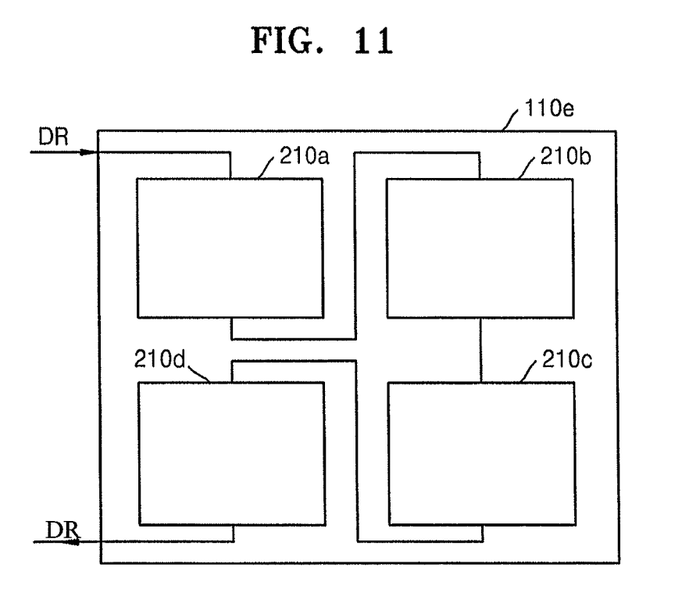
FIG. 11 illustrates a block diagram schematically showing the structure of an organic light emitting panel, according to an exemplary embodiment.

FIG. 11 illustrates a block diagram schematically showing the structure of an organic light emitting panel 110e according to an exemplary embodiment. Referring to FIG. 11, the organic light emitting panel 110e may include a plurality of light emitting layers between the anode and the cathode so that a serial connection between the organic light emitting panels 110e may be established. According to the present embodiment, the organic light emitting panel 110e may be embodied by serially connecting a plurality of light emitting units 210a, 210b, 210c, and 210d. The light emitting units 210a, 210b, 210c, and 210d may have, e.g., any of the structures described with reference to FIGS. 4-7.

As an example, the organic light emitting panel 110e may be embodied by serially connecting a first light emitting unit 210a, a second light emitting unit 210b, a third light emitting unit 210c, and a fourth light emitting unit 210d. In the structure, the drive current DR may be input to the anode of the first light emitting unit 210a, the cathode of the first light emitting unit 210a and the anode of the second light emitting unit 210b may be connected, the cathode of the second light emitting unit 210b and the anode of the third light emitting unit 210c may be connected, the cathode of the third light emitting unit 210c and the anode of the fourth light emitting unit 210d may be connected, and the drive current DR may be output of the fourth light emitting unit 210d.

In the structure in which the light emitting units 210a, 210b, 210c, and 210d are serially connected, since a voltage is applied to the light emitting units 210a, 210b, 210c, and 210d by voltage distribution, a higher voltage may be applied to the organic light emitting panel 110e, compared to the structure in which the organic light emitting panel is formed by a single unit. Since in the present embodiment the IR voltage drop phenomenon may be remarkably reduced in each light emitting unit, compared to the structure in which the organic light emitting panel is formed by a single unit, when the illuminating apparatus 100 having a large size is embodied, there is an effect of emitting light having a constant brightness.

Also, in the present embodiment in which the organic light emitting panel 110e is embodied by the light emitting units 210a, 210b, 210c, and 210d, compared to the structure in which the organic light emitting panel 110 is formed by a single unit, since the size of each of the light emitting units 210a, 210b, 210c, and 210d decreases, high current density may be embodied by a small current strength A. Thus, there is an effect that color temperature control in a wide range may be achieved with a low current.

The illuminating apparatus according to exemplary embodiments may be used as an illuminating apparatus capable of controlling the color temperature and brightness. Furthermore, the illuminating apparatus may be applied to a backlight unit of a liquid crystal display device so that the brightness or color temperature of the liquid crystal display device may be precisely controlled using the backlight unit. In addition, the illuminating apparatuses may be applied to a variety of cases.

As described above, in the illuminating apparatus using an organic light emitting panel according to exemplary embodiments may control the color temperature and brightness of light emitted from the illuminating apparatus by using a small number of drive signals.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An illuminating apparatus, comprising:
    a drive circuit that generates a drive current; and
    an organic light emitting panel that receives the drive current to emit light and that includes a plurality of organic light emitting layers to emit light of different color components,
    wherein the drive circuit is capable of controlling a color temperature from the organic light emitting panel by controlling a current strength of the drive current, and is capable of controlling a brightness of the emitted light according to a pulse width of the drive current, and
    wherein the organic light emitting panel includes:
        an anode,
        a first light emitting layer that emits light having a first color component by a first combination of electrons and holes,
        a second light emitting layer that emits light having a second color component different from the first color component by a second combination of the electrons and the holes, and
        a cathode.

2. The illuminating apparatus of claim 1, wherein the organic light emitting panel further includes an electron transport/hole blocking layer that blocks transport of the electrons or blocks transport of the holes.

3. The illuminating apparatus of claim 1, wherein the organic light emitting panel further includes a carrier generation layer between the first and second light emitting layers.

4. The illuminating apparatus of claim 1, wherein the organic light emitting panel further includes at least one of a hole injection/transport layer that is adjacent to the anode and that transports the holes in response to the drive current, and an electron injection/transport layer that is adjacent to the cathode and that transports the electrons in response to the drive current.

5. The illuminating apparatus of claim 1, wherein the organic light emitting panel further includes a third light emitting layer that emits light having a third color component by a third combination of the electrons and the holes.

6. The illuminating apparatus of claim 5, wherein the third color component is a same color component as the first color component and the second light emitting layer is between the first and third light emitting layers.

7. The illuminating apparatus of claim 1, wherein the organic light emitting panel includes a plurality of light emitting units, the light emitting units receiving the drive current and being serially connected to one another.

8. The illuminating apparatus of claim 1, wherein the organic light emitting panel includes at least one of a first auxiliary electrode that is connected to the anode and a second auxiliary electrode that is connected to the cathode, the first and second auxiliary electrodes being formed in a mesh structure.

9. The illuminating apparatus of claim 1, wherein the drive circuit includes:
    a brightness control unit that controls the pulse width of the drive current in response to a brightness control signal, and
    a color temperature control unit that controls the current strength of the drive current in response to a color temperature control signal, the color temperature signal corresponding to red, green, and/or blue colors.

10. The illuminating apparatus of claim 1, wherein the first color component is one of a red color and a blue color and the second color component is another one of the red color and the blue color.

11. The illuminating apparatus of claim 1, wherein the illuminating apparatus is a backlight unit of a liquid crystal display device.

12. A method of driving an illuminating apparatus, the illuminating apparatus including an organic light emitting panel that receives a drive current to emit light and that includes a plurality of organic light emitting layers to emit light of different color components, the method comprising:
    controlling a pulse width of the drive current in response to a brightness control signal;
    controlling a current strength of the drive current in response to a color temperature control signal; and
    outputting the drive current to the organic light emitting panel, wherein the organic light emitting panel that receives the drive current includes a first light emitting layer emitting light having a first color component by a first combination of electrons and holes and a second light emitting layer emitting light having a second color component by a second combination of the electrons and the holes.

13. The method of claim 12, wherein the organic light emitting panel further includes an electron transport/hole blocking layer that blocks transport of the electrons or blocks transport of the holes.

14. The method of claim 12, wherein the organic light emitting panel further includes a carrier generation layer between the first and second light emitting layers.

15. The method of claim 12, wherein the organic light emitting panel further includes a third light emitting layer emitting light having a third color component by a third combination of the electrons and the holes.

16. The method of claim 15, wherein the third color component is a same color component as the first color component and the second light emitting layer is between the first and third light emitting layers.

17. The method of claim 12, wherein the organic light emitting panel includes a plurality of light emitting units, the light emitting units receiving the drive current and being serially connected to one another.

18. The method of claim 12, wherein the organic light emitting panel includes at least one of a first auxiliary electrode that is connected to an anode and a second auxiliary electrode that is connected to a cathode, and the first and second auxiliary electrodes being formed in a mesh structure.

19. The method of claim 12, wherein the first color component is one of a red color and a blue color and the second color component is another of the red color and the blue color.

20. The method of claim 12, wherein the illuminating apparatus is a backlight unit of a liquid crystal display device.

* * * * *